United States Patent [19]

Aoki et al.

[11] 4,252,425
[45] Feb. 24, 1981

[54] CAMERA FOCUS DETECTING DEVICE

[75] Inventors: Harumi Aoki, Kiyose; Yoshio Sawada, Tokyo, both of Japan

[73] Assignee: Asahi Kogaku Kogyo Kabushiki Kaisha, Tokyo, Japan

[21] Appl. No.: 102,071

[22] Filed: Dec. 10, 1979

[30] Foreign Application Priority Data

Dec. 28, 1978 [JP] Japan ............................. 53-164960

[51] Int. Cl.³ .............................................. G03B 3/10
[52] U.S. Cl. ........................................ 354/25; 354/31
[58] Field of Search .................... 354/25, 31; 352/140; 355/56; 356/4

[56] References Cited

U.S. PATENT DOCUMENTS

| | | | |
|---|---|---|---|
| 4,083,056 | 4/1978 | Nakamura et al. | 354/25 |
| 4,180,309 | 12/1979 | Miyata et al. | 354/25 |

*Primary Examiner*—Michael L. Gellner
*Attorney, Agent, or Firm*—Sughrue, Rothwell, Mion, Zinn and Macpeak

[57] ABSTRACT

An automatic focus detecting device for a camera including a self-scanning type photoelectric element unit including plural minute photoelectric elements disposed in a plane corresponding to the position of the image forming plane of the photographing lens of the camera. The photoelectric element unit is scanned and the output signals from the unit are sampled and held over a scanning time period. The output signals from second adjacent ones of the elements are coupled to differential circuits the outputs of which are multiplexed onto a single output line. The peak value of the multiplexed signal is detected. When the peak value signal is at its maximum, the camera will be in proper focus.

6 Claims, 14 Drawing Figures

CAMERA FOCUS DETECTING DEVICE

BACKGROUND OF THE INVENTION

The invention relates to a focus detecting device which automatically detects the focus of a photographing lens operating on the principle that when the photographing lens is focussed on the object the contrast of the image of the object becomes a maximum.

The optical image of an object formed by a photographing lens exhibits a maximum in contrast when the image is precisely focussed. This phenomenon can be explained by the fact that the light intensity (power spectrum) of the image with respect to each spatial frequency takes the maximum value when the image is precisely focussed. Thus, if the point of maximum contrast can be detected, on the basis of the phenomenon then the focus can be detected. Accordingly, a variety of automatic focus detecting devices which operate on this principle have been known in the art.

Methods for detecting contrast data can be generally classified into two systems. In the first system, a number of microphotoelectric elements are arranged on the image forming plane of the photographing lens. Among these microphotoelectric elements, a pair of adjacent elements are selected and the difference between the photoelectric outputs is statically detected to provide a contrast signal. In the second system, the optical image is scanned mechanically or electrically and a time series signal representative of the brightness distribution of the obtained image is subjected to differentiation or other such signal processing to dynamically produce a contrast signal.

Recently, an automatic focus detecting device according to the latter system has been proposed in which a self-scanning type photoelectric element unit is employed as an optical image scanner. The self-scanning type photoelectric element unit is made up of plural microphotoelectric elements and a scanning circuit. In the automatic focus detecting device, the self-scanning type photoelectric element unit is positioned in a plane in which the optical image is formed and the photoelectric outputs of the elements are successively and electrically extracted to provide a discrete time series signal. This signal is converted into an analog waveform using a sample-and-hold circuit and a smoothing circuit after which the analog waveform is differentiated in a differentiation circuit to provide an output corresponding to the gradient of the brightness distribution of the optical image, the output being employed as the contrast signal.

The self-scanning type photoelectric element unit is advantageous in that, as it can accumulate light over an entire scanning period, a sufficiently high photo-electric output can be obtained even when the brightness is low. Also, in contrast to previous systems in which it was necessary to provide as many photocurrent-voltage conversion circuits or amplifier circuits as there are pairs of photoelectric elements, only a single photocurrent-voltage conversion circuit or amplifier can process the output signals of the photoelectric elements because a time series signal is utilized. Furthermore, the system in which the brightness distribution of an image is subjected to differentiation using a self-scanning type photoelectric element unit is advantageous in that light low in intensity can be detected owing to the charge storage effect of the elements. However, it is still disadvantageous in that the differentiation waveform is so steep that it is difficult to sample and hold the differentiation output thereof so that it is necessary to provide an intricate circuit in order to hold the differentiation output. In addition, in this device a discrete photoelectric conversion waveform is formed at each microphotoelectric element. In order to convert this waveform into an accurate analog waveform it is required to remove an unwanted high frequency component. However, in this case, a necessary high spatial frequency component of the optical image is also removed as a result of which the focus detection accuracy is decreased.

In the prior system in which the difference between the photoelectric outputs of adjacent photo-electric elements is statically extracted, unlike the latter system, it is unnecessary to provide such an intricate circuit because no differentiation waveform is employed. However, the first system suffers from a problem that in the case where it is used with a moving object or the camera is shaken, the output difference changes depending on whether the edge of the brightness distribution of the object's image is applied to a photoelectric element or not making it impossible to obtain contrast data of high accuracy.

SUMMARY OF THE INVENTION

Accordingly, an object of this invention is to provide a focus detecting device in which a high photoelectric sensitivity characteristic due to the storage effect of the self-scanning type photo-electric element unit is utilized and no differentiation circuit is employed yet the contrast signal does not vary even when the object is moving or the camera is shaken. In the focus detecting device according to the invention, no differentiation process is carried out. Accordingly, the device has significant merits in that the circuit is simple, the device itself is compact. Even when the device is incorporated in an ordinary camera, it can carry out automatic focus detection with high accuracy.

This, as well as other objects of the invention, may be met by an automatic focus detecting device for a camera including a self-scanning type photoelectric element unit including a plurality of microphotoelectric elements disposed substantially in a plane corresponding to the position of the image forming plane of a photographing lens of the camera and a scanning circuit, a plurality of means for producing signals representing the difference in magnitude in output signals from corresponding second adjacent photoelectric elements, and means for sensing the peak value of those signals over each scanning period. Second adjacent as used herein refers to every other photoelectric element, for example, in an ordered element row, the first and third elements, the second and fourth elements, the third and fifth elements, and so forth. In the preferred embodiment, the peak sensing means includes means for time multiplexing the signals representing the difference onto a single signal line and means for detecting a peak value of the multiplexed signal on the single signal line over each scan period. Also in the preferred embodiment, sampling and holding means is provided for the outputs of each of the photoelectric elements.

The invention may also be practiced by an automatic focus detecting device for a camera including a self-scanning type photoelectric element unit including a plurality of microphotoelectric elements disposed substantially in a plane corresponding to the position of the image forming plane of a photographing lens of the camera and a scanning circuit, a first memory circuit for holding the output signal of a microphotoelectric element in the self-scanning type photoelectric element unit for a given period of time, a second memory circuit for holding for a given period time the output signal of a microphotoelectric element second adjacent the microphotoelectric element whose output is held by the first memory circuit, a differential circuit for producing a signal representing the difference between the outputs of the first and second memory circuits and means for detecting the maximum value of the signal representing the difference so as to detect the focus of the photographing lens.

To this effect, there may be provided a drive circuit for driving the self-scanning type photoelectric element unit, first through fourth sample-and-hold circuit coupled to receive output signals from first through fourth ordered elements respectively for converting output signals from the photoelectric element unit into analog wave forms, a first differential circuit for producing a signal representing the difference between the outputs of the first and third sample-and-hold circuits, a second differential circuit for producing a signal representing the difference between the outputs of the second and fourth sample-and-hold circuits, a switching circuit for alternately coupling the outputs of the first and second differential circuits to an output in response to driving clock pulses of the self-scanning type photoelectric element unit to provide a single differential output, and absolute value circuit for detecting the absolute value of the output of the switching circuit, and a peak value holding circuit for holding the peak value of an absolute value waveform produced by the absolute value circuit in a single scanning period of the photoelectric element unit. Further there may be provided means for producing sampling pulses for operating the first through fourth sample-and-hold circuits so that the first through fourth sample-and-hold circuits retain the outputs of the 4 n-th, 4 (n+1)-th, 4 (n+2)-th, and 4(n+3)-th microphotoelectric elements in the self-scanning type photoelectric element unit, respectively, where n is a positive integer.

BRIEF DESCRIPTION OF THE DRAWINGS

The invention will be described in detail with reference to the accompanying drawings.

FIG. 5A shows the output waveform of a self-scanning type photoelectric element unit, FIGS. 5B-5E first through fourth sample-and-hold waveforms, FIG. 5F a composite differential waveform, FIG. 5G an absolute value waveform, and FIG. 5H a waveform in which the peak value is held;

DETAILED DESCRIPTION OF THE PREFERRED EMBODIMENT

Figure 1:
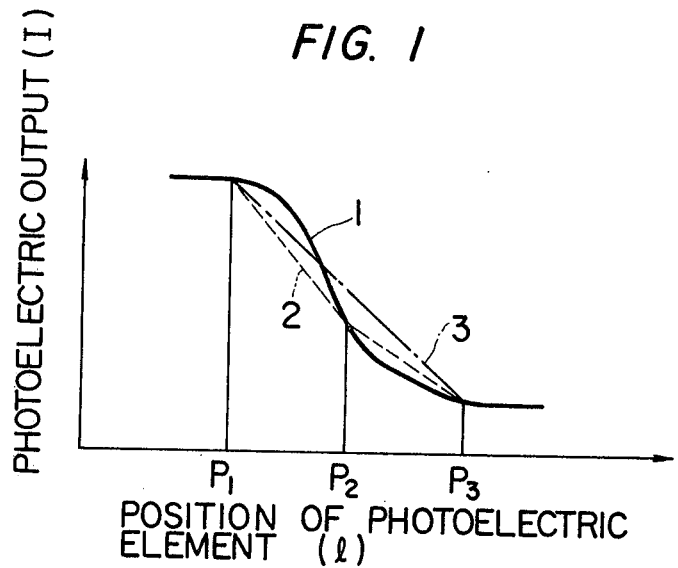
FIG. 1 is a graphical representation for a description of fundamental principles of the invention.

FIG. 1 is a graphical representation indicating the relation between the photoelectric outputs of three optically selected adjacent microphotoelectric elements in a self-scanning type photoelectric element unit and the brightness distribution of the image of an object. In FIG. 1, reference characters $P_1$, $P_2$ and $P_3$ designate three different microphotoelectric elements. FIG. 1 shows pulse-shaped discrete outputs which are produced when the image of an object having a brightness distribution as indicated by the solid line 1 is applied to the photoelectric elements. Determination of the difference between the outputs of two adjacent elements corresponds to determining the gradient as indicated by the dotted line 2. Determination of the difference between the outputs of two elements which are picked up every other element corresponds to determining the gradient as indicated by the dot-chain line 3.

Detection of the difference between the outputs of two microphotoelectric elements from every other element is advantageous in that the differentiation value of the brightness distribution of the object's image, that is, the contrast variation, can be determined with higher accuracy. Also, as the difference between the outputs is larger, the signal can be readily processed in the circuit. Furthermore, this technique is advantageous over the prior constructions in that in the prior devices the difference between the outputs of adjacent elements varies depending on whether or not the edge of the brightness distribution of the object's image is on one microphotoelectric element while the difference between the outputs of two microphotoelectric elements which are derived from every other element is not. Accordingly, in the latter case, even when the object is moving or the camera is shaken and the aforementioned edge is moved in a plane perpendicular to the optical axis, a correct contrast signal can be obtained. Thus, a specific feature of the invention resides in that the difference between the outputs of two microphotoelectric elements is derived from every other element in conjunction with the use of a self-scanning type photoelectric element unit.

Figure 2:
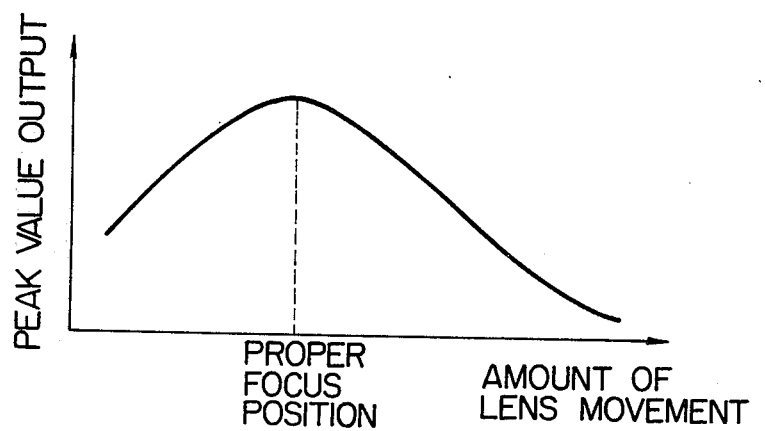
FIG. 2 is a graphical representation indicating the distribution of peak values representative of the contrast signal of an object observed when the lens is moved through a proper focus position.

The peak value of the contrast signal in one scanning period of the self-scanning type photoelectric element unit is a maximum when the image is precisely focussed. FIG. 2 is a graphical representation indicating the fact that, as described above, the peak value of the contrast signal is a maximum when the photographing lens is moved to the proper focus position.

Figure 3:
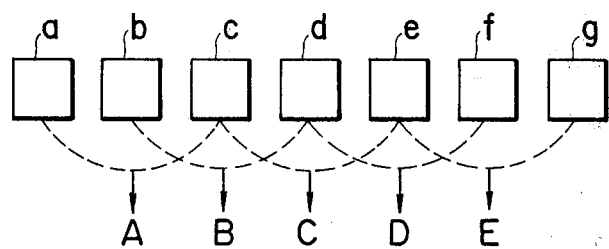
FIG. 3 is an explanatory diagram for a description of the production of a contrast signal employed in this invention.

FIG. 3 shows in simplified form a technique for deriving the contrast signals. In FIG. 3, reference characters a, b, c, d, e, f and g designate adjacent microphotoelectric elements in the self-scanning type photoelectric element unit. The difference in photoelectric output between the elements a and c is extracted as a signal A, the difference in photoelectric output between the elements b and d is extracted as a signal B, and so forth. In this fashion, the difference between signals from every other element is extracted as a signal.

Figure 4:
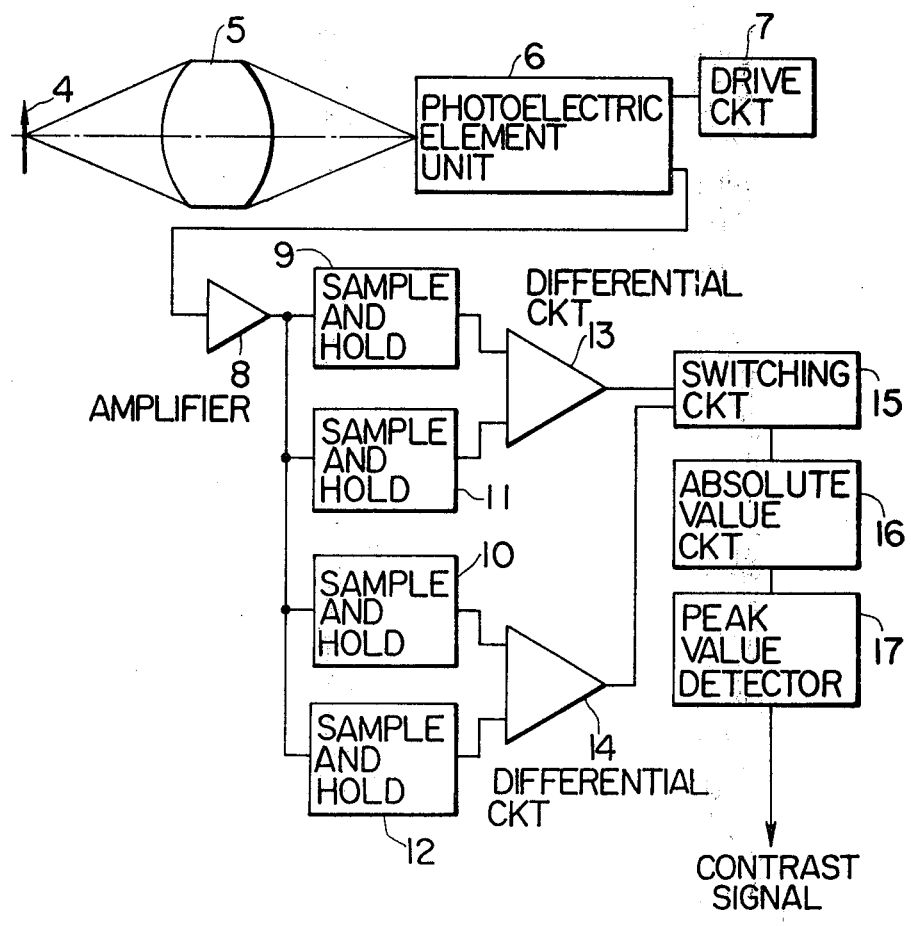
FIG. 4 is a block diagram showing an example of a focus detecting device according to the invention.
Figure 5:
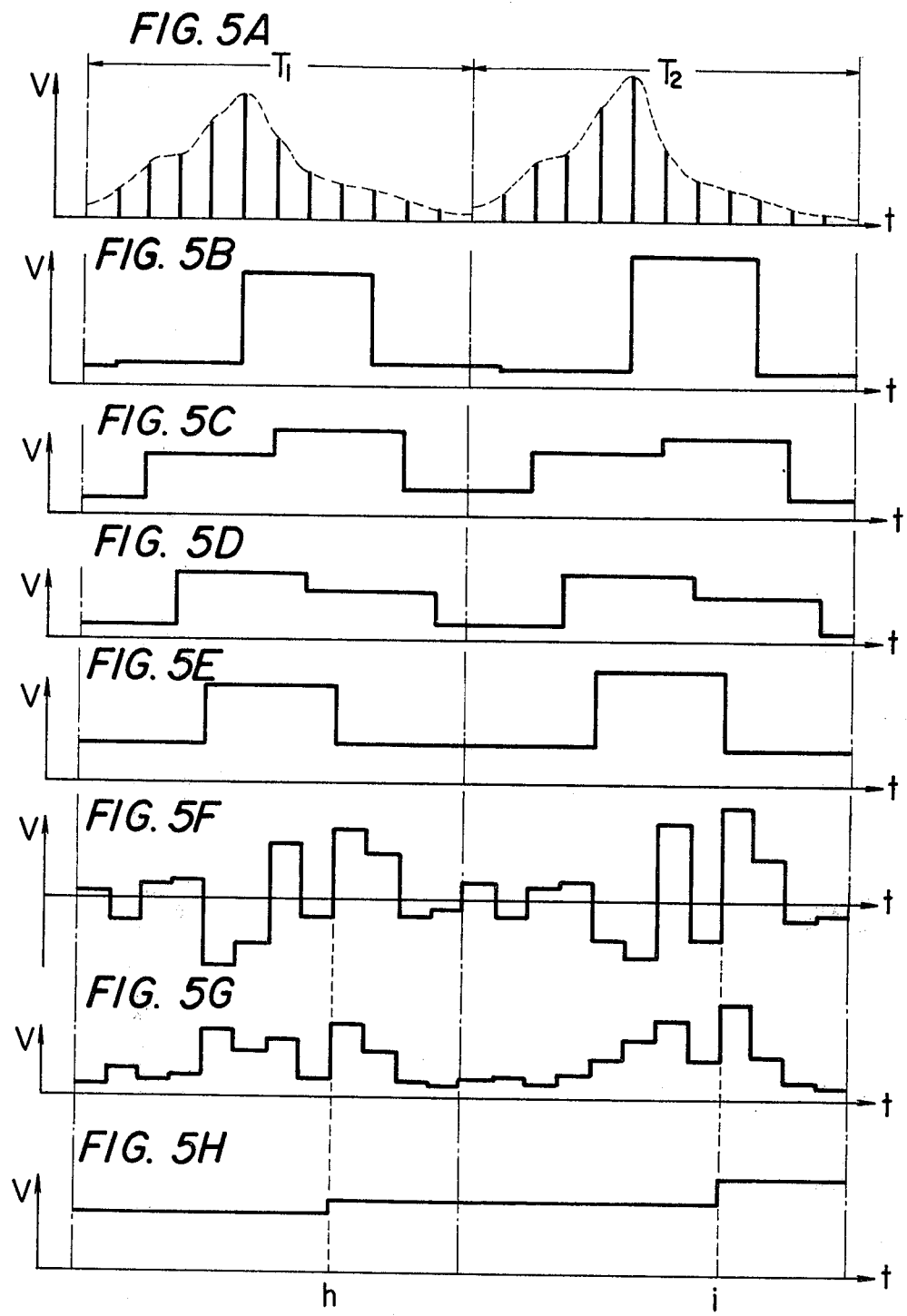
FIGS. 5A-5H are a timing diagrams showing various waveforms in the focus detecting device according to the invention. More specifically.

FIG. 4 is a block diagram showing an arrangement of a focus detecting device according to this invention while FIGS. 5A-5H show waveforms relating to the processing of detected signals. Referring to FIG. 4, the image of an object 4 is formed on a self-scanning type photoelectric element unit 6 by means of a lens 5. The self-scanning type photoelectric element unit 6 is driven by a drive circuit 7 which generates clock pulses providing a discrete time series waveform as shown in FIG. 5A according to the brightness distribution of the image. In FIG. 5A, the dotted line indicates the brightness distribution of the image. After being amplified by an amplifier circuit 8, the discrete waveform is applied to four sample-and-hold circuits 9, 10, 11 and 12 simultaneously. Sampling pulses are provided to the first sample-and-hold circuit 9 at times such that the first sample-and-hold circuit 9 holds the discrete output of every fourth microphotoelectric element as shown in FIG. 5B. Sampling pulses are applied to the second sample-and-hold circuit 10 delayed by one clock pulse, corresponding to one photoelectric element unit, from the sampling pulses coupled to the first sample-and-hold circuit 9 thereby causing the second sample-and-hold circuit 10 to hold the discrete output of every fourth microphotoelectric element shifted one element from that of the first sample-and-hold circuit as shown in FIG. 5C. Similarly, the third sample-and-hold circuit 11 holds the discrete output of every fourth microphotoelectric element with a delay of one clock pulse as shown in FIG. 5D and the fourth sample-and-hold circuit 12 holds the discrete output of every fourth minute photoelectric element with a delay of one clock pulse from the third sample-and-hold circuit as shown in FIG. 5E.

The output waveforms of the first and third sample-and-hold circuits 9 and 11 are applied to a first differential circuit 13 where they are converted into a waveform corresponding to the difference between the two waveforms. Similarly, the difference between the output wave forms of the second and fourth sample-and-hold circuits 10 and 12 is produced by a second differential circuit 14. These two output waveforms of the first and second differential circuits 13 and 14 are multiplexed by a switching circuit 15 into a single time series signal.

FIG. 5F shows the differential waveform thus composed. This waveform corresponds to the difference between the outputs of two photoelectric elements which are selected every other elements as illustrated in FIG. 3. The differential waveform is converted into a positive or negative absolute value waveform by an absolute value circuit 16 as shown in FIG. 5G. Thereafter, the peak value of the absolute value waveform during one scanning period thereof is detected by a peak value detecting circuit 17 and is held thereby until the peak value in the next scanning period is detected. The peak value output waveform thus held is shown in FIG. 5H. This peak value signal is representative of the contrast signal of the image reaching its maximum value when the image is precisely focussed, that is, at the proper focus position as shown in FIG. 2.

Figure 6:
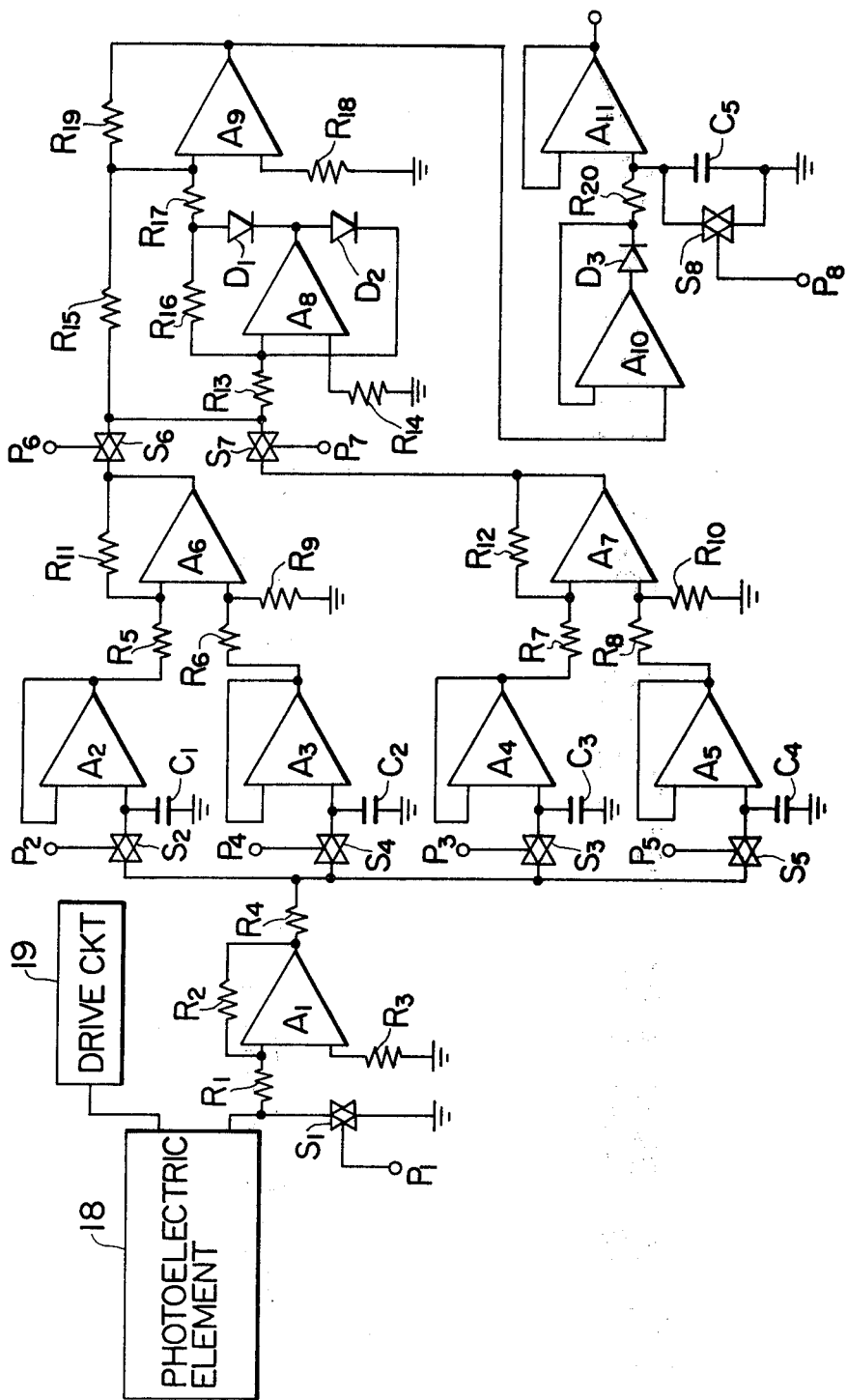
FIG. 6 is a circuit diagram showing an example of focus detecting device according to the invention.
Figure 7:
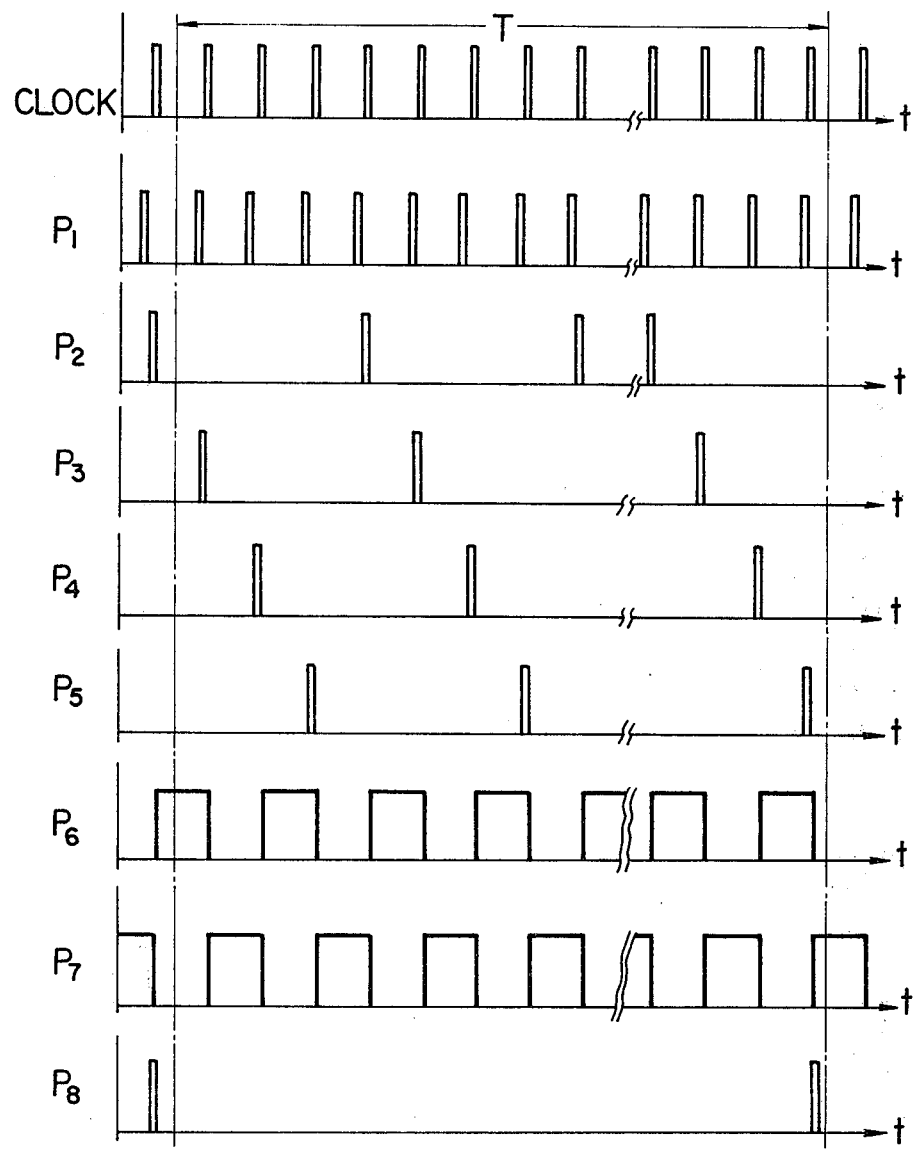
FIG. 7 is a timing diagram showing clock pulses for driving a self-scanning type photo-electric element unit and pulses for controlling eight analog switches which are employed in the focus detecting device according to the invention.

FIG. 6 is a circuit diagram showing an example of a focus detecting device according to the invention. FIG. 7 is a timing diagram showing various control pulses streams applied to analog switches $S_1$ through $S_8$ and a clock pulse stream which drives a self-scanning type photoelectric element unit, all of which are employed in the circuit. In FIG. 7 reference character T designates one scanning period.

The self-scanning type photoelectric element unit 18 is driven by a drive circuit 19 including a pulse oscillator producing a discrete time series signal which is amplified by an operational amplifier $A_1$. The analog switch $S_1$, controlled by the pulse $P_1$, operates to separate the outputs of the microphotoelectric elements.

The amplified discrete signal is divided into four parts which are converted into sample-and-hold waveforms by means of the analog switches $S_2$, $S_3$, $S_4$ and $S_5$ and capacitors $C_1$, $C_2$, $C_3$ and $C_4$, respectively. The sampling pulses $P_2$, $P_3$, $P_4$ and $P_5$ are applied respectively to the analog switches $S_2$, $S_3$, $S_4$ and $S_5$. The two signals which have been converted into analog signals by the analog switches $S_2$ and $S_4$ are applied through operational amplifiers $A_2$ and $A_3$, which serve as buffer amplifiers, to an operational amplifier $A_6$ in which the differential between the two signals is produced. Similarly, the two signals provided by the analog switches $S_3$ and $S_5$ are applied through operational amplifiers $A_4$ and $A_5$, which serve as buffer amplifiers, to an operational amplifier $A_6$ in which the differential between the two signals is produced.

The two differential outputs are switched by the analog switches $S_6$ and $S_7$ which are controlled by the pulses $P_6$ and $P_7$ as a result of which a single time series signal is formed. The time series signal, or the differential outputs thus composed, are converted into a positive absolute value waveform by means of an operational amplifier $A_8$ and diodes $D_1$ and $D_2$. The absolute waveform is amplified by an operational amplifier $A_9$ and the peak value of the absolute waveform in one scanning period thereof is held by means of a diode $D_3$ and a capacitor $C_5$. The analog switch $S_8$, controlled by the pulse $P_8$, operates to discharge the capacitor every scanning period. The peak value output thus obtained is applied to an operational amplifier $A_{11}$ which serves as a buffer amplifier thereby providing a focus indicating signal every scanning period.

As is apparent from the above description, a first specific advantageous feature of the focus detecting device according to the invention resides in that, unlike a conventional automatic focus detecting device, it is unnecessary to smooth the sample-and-hold waveform which is the discrete photoelectric conversion output of the self-scanning type photoelectric element unit. Accordingly, the high spatial frequency component of objects which is necessary for accurate detection of contrast is not lost and the focus can be accurately detected. A second specific feature resides in the fact that the differential output representative of the contrast signal is not so sharp as the differential waveform which was utilized heretofore and, accordingly, the peak value during one scanning period thereof can be readily held and the accurate peak value thereof be determined. A third specific advantageous feature resides in the fact that the difference between the outputs of any two microphotoelectric elements which are selected every other element is detected with the high optical sensitivity characteristic due to the storage effect of the self-scanning type photoelectric element unit utilized so that therefore, even if an object is dark or moving or even when the camera is shaken, the contrast thereof can be accurately detected.

Thus, the focus detecting device according to the invention is simple in its circuit arrangement and compact in construction and can be applied to a variety of camera devices.

What is claimed is:
1. An automatic focus detecting device for a camera comprising: a self-scanning type photoelectric element unit including a plurality of microphotoelectric elements disposed substantially in a plane corresponding to the position of the image forming plane of a phtotgraphing lens of said camera and a scanning circuit, a plurality of means for producing signals representing the difference in magnitude in output signals from corresponding second adjacent photoelectric elements, and means for sensing the peak value of said signals over each scan period.

2. The automatic focus detecting device for a camera of claim 1 wherein said peak sensing means comprises: means for time multiplexing said signals onto a single signal line and means for detecting a peak value of the multiplexed signal on single signal line over each scan period.

3. The automatic focus detecting device for a camera of either claim 1 or 2 further comprising means for sampling and holding signals from each of said photoelectric elements.

4. An automatic focus detecting device for a camera comprising: a self-scanning type photoelectric element unit including a plurality of microphotoelectric elements disposed substantially in a plane corresponding to the position of the image forming plane of a photographing lens of said camera and a scanning circuit, a first memory circuit for holding the output signal of a microphotoelectric element in said self-scanning type photoelectric element unit for a given period of time, a second memory circuit for holding for a given period of time the output signal of a microphotoelectric element second adjacent said microphotoelectric element whose output is held by said first memory circuit, and a differential circuit for producing a signal representing the difference between the outputs of said first and second memory circuits and means for determining the maximum value of said signal representing said difference to detect the focus of said photographing lens.

5. An automatic focus detecting device for a camera comprising: a self-scanning type photoelectric element unit including a plurality of microphotoelectric elements disposed substantially in a plane corresponding to the position of the image forming plane of a photographing lens of said camera and a scanning circuit, a drive circuit for driving said self-scanning type photoelectric element unit, first, second, third and fourth sample-and-hold circuits coupled to receive output signals from first through fourth ordered elements respectively for converting output signals from said photoelectric element unit into analog waveforms, a first differential circuit for producing a signal representing the difference between the outputs of said first and third sample-and-hold circuits, a second differential circuit for producing a signal representing the difference between the outputs of said second and fourth sample-and-hold circuits, a switching circuit for alternately coupling the outputs of said first and second differential circuits to an output in response to driving clock pulses of said self-scanning type photoelectric element unit to provide a single differential output, an absolute value circuit for detecting the absolute value of the output of said swtiching circuit, and a peak value holding circuit for holding the peak value of an absolute value waveform produced by said absolute value circuit in one scanning period of said self-scanning type photoelectric element unit.

6. The automatic focus detecting device of claim 2 further comprise means for producing sampling pulses for operating said first through fourth sample-and-hold circuits so that said first, second, third and fourth sample-and-hold circuits hold the outputs of the 4n-th, 4(n+1)-th, 4(n+2)-th and 4(n+3)-th minute phtotoelectric elements in said self-scanning type photoelectric element unit respectively, where n is a positive integer.

* * * * *